United States Patent
Bokkes et al.

(10) Patent No.: US 11,904,545 B2
(45) Date of Patent: Feb. 20, 2024

(54) APPARATUS FOR ADDITIVELY MANUFACTURING THREE-DIMENSIONAL OBJECTS

(71) Applicant: CONCEPT LASER GMBH, Lichtenfels (DE)

(72) Inventors: Tobias Bokkes, Untersiemau (DE); Philipp Schumann, Itzgrund-Schottenstein (DE); Stephan Hunze, Pirna (DE); Tim Klaußner, Kronach (DE); Fabian Zeulner, Lichtenfels (DE); Marie-Christin Ebert, Coburg (DE)

(73) Assignee: CONCEPT LASER GMBH, Lichtenfels (DE)

( * ) Notice: Subject to any disclaimer, the term of this patent is extended or adjusted under 35 U.S.C. 154(b) by 761 days.

(21) Appl. No.: 16/162,274

(22) Filed: Oct. 16, 2018

(65) Prior Publication Data

US 2019/0176396 A1 Jun. 13, 2019

(30) Foreign Application Priority Data

Dec. 8, 2017 (EP) .................................... 17206268

(51) Int. Cl.
*B29C 64/268* (2017.01)
*B33Y 10/00* (2015.01)
(Continued)

(52) U.S. Cl.
CPC ............ *B29C 64/268* (2017.08); *B22F 10/28* (2021.01); *B22F 10/31* (2021.01); *B22F 12/44* (2021.01);
(Continued)

(58) Field of Classification Search
CPC ... B29C 64/268; B29C 64/153; B29C 64/386; B29C 64/286; B29C 64/30; B33Y 10/00;
(Continued)

(56) References Cited

U.S. PATENT DOCUMENTS

| 7,867,431 B2 | 1/2011 | Higashi et al. |
| 10,124,537 B2 | 11/2018 | Schwarze et al. |

(Continued)

FOREIGN PATENT DOCUMENTS

| CN | 105965015 A | 9/2016 |
| CN | 107101717 A | 8/2017 |

(Continued)

OTHER PUBLICATIONS

Combined Chinese Search Report and Office Action Corresponding to Application No. 201810039392 dated Jul. 30, 2020.

(Continued)

*Primary Examiner* — Joseph S Del Sole
*Assistant Examiner* — John Robitaille
(74) *Attorney, Agent, or Firm* — Dority & Manning, P.A.

(57) ABSTRACT

Apparatus (1) for additively manufacturing three-dimensional objects (2) by means of successive layerwise selective irradiation and consolidation of layers of a build material (3) which can be consolidated by means of at least one energy beam (4), which apparatus (1) comprises an irradiation device (5) with at least one beam guiding element (7) on which the energy beam (4) is partially reflected, wherein a first beam part (10) extends between the beam guiding element (7) and a build plane (18) of the apparatus (1) and a second beam part (11) is transmitted through or scattered at the beam guiding element (7), wherein a determination device (12) is provided that is adapted to determine at least one parameter of the second beam part (11).

16 Claims, 1 Drawing Sheet

(51) Int. Cl.
- *B33Y 30/00* (2015.01)
- *B29C 64/153* (2017.01)
- *B29C 64/30* (2017.01)
- *B33Y 40/00* (2020.01)
- *B29C 64/386* (2017.01)
- *B33Y 50/00* (2015.01)
- *B22F 10/28* (2021.01)
- *B22F 12/44* (2021.01)
- *B22F 10/31* (2021.01)
- *B29C 64/286* (2017.01)
- *B22F 10/14* (2021.01)
- *B22F 12/41* (2021.01)
- *B22F 12/90* (2021.01)
- *B22F 10/32* (2021.01)

(52) U.S. Cl.
CPC .......... *B29C 64/153* (2017.08); *B29C 64/286* (2017.08); *B29C 64/30* (2017.08); *B29C 64/386* (2017.08); *B33Y 10/00* (2014.12); *B33Y 30/00* (2014.12); *B33Y 40/00* (2014.12); *B33Y 50/00* (2014.12); *B22F 10/14* (2021.01); *B22F 10/32* (2021.01); *B22F 12/41* (2021.01); *B22F 12/90* (2021.01); *B22F 2999/00* (2013.01)

(58) Field of Classification Search
CPC ......... B33Y 30/00; B33Y 40/00; B33Y 50/00; B22F 10/10
See application file for complete search history.

(56) References Cited

U.S. PATENT DOCUMENTS

| | | |
|---|---|---|
| 2006/0215246 A1 | 9/2006 | Kerekes et al. |
| 2009/0051935 A1* | 2/2009 | Cooper ................ G02B 26/101 356/616 |
| 2009/0206065 A1 | 8/2009 | Kruth et al. |
| 2015/0183158 A1* | 7/2015 | Schwarze ............... B22F 12/44 264/497 |
| 2016/0263704 A1 | 9/2016 | Schwarze et al. |
| 2017/0242424 A1 | 8/2017 | Spears |
| 2017/0266727 A1 | 9/2017 | Nishino et al. |
| 2019/0022946 A1 | 1/2019 | Jones et al. |

FOREIGN PATENT DOCUMENTS

| | | |
|---|---|---|
| EP | 1705616 A1 | 9/2006 |
| EP | 2032345 A1 | 3/2009 |
| EP | 3067132 A1 | 9/2016 |
| EP | 3210713 A1 | 8/2017 |
| JP | 2005/336547 A | 12/2005 |
| JP | 2006/154126 A | 6/2006 |
| JP | 2015120342 A | 7/2015 |
| JP | 2016060063 A | 4/2016 |
| WO | 2007147221 A1 | 12/2007 |
| WO | WO2017/085468 A1 | 5/2017 |

OTHER PUBLICATIONS

European Search Report Corresponding to Application No. 17206268 dated Jun. 8, 2018.
Machine Translated Japanese Office Action Corresponding to Application No. 2018120433 dated Mar. 15, 2019.

\* cited by examiner

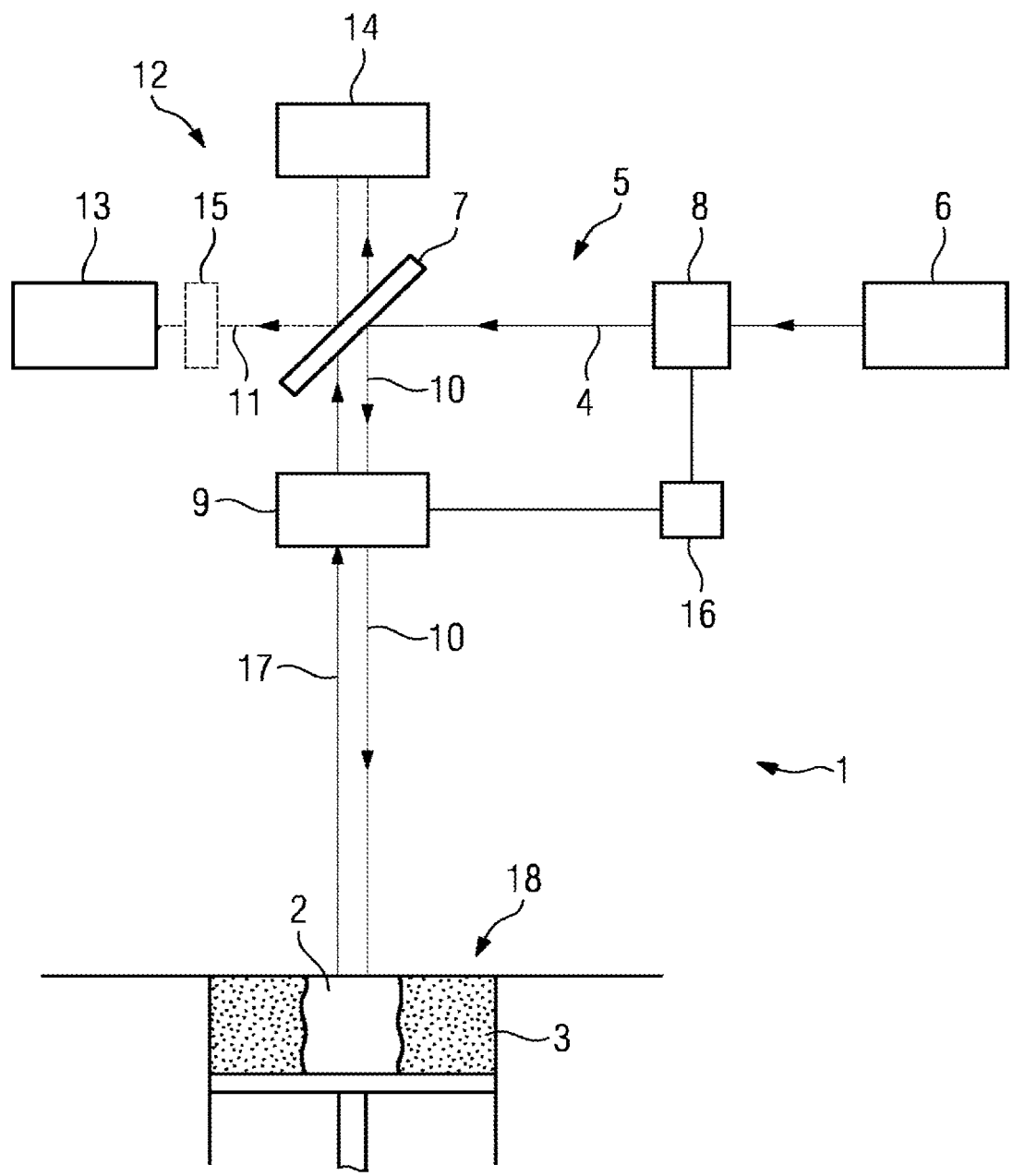

APPARATUS FOR ADDITIVELY MANUFACTURING THREE-DIMENSIONAL OBJECTS

CROSS-REFERENCE TO RELATED APPLICATIONS

This application claims priority to European Patent Application serial no. 17 206 268.9 filed Dec. 8, 2017, the contents of which is incorporated herein by reference in its entirety as if set forth verbatim.

The invention relates to an apparatus for additively manufacturing of three-dimensional objects by means of successive layerwise selective irradiation and consolidation of layers of a build material which can be consolidated by means of at least one energy beam, which apparatus comprises an irradiation device with at least one beam guiding element on which the energy beam is partially reflected, wherein a first beam part extends between the beam guiding element and a build plane of the apparatus and a second beam part is transmitted through or scattered at the beam guiding element.

Such apparatuses that comprise an irradiation device adapted to generate an energy beam, such as a laser beam or an electron beam are generally known from prior art.

To ensure that process requirements, in particular regarding process quality or object quality, are met, inter alia an irradiation parameter relating to the energy beam can be determined. Thus, the quality of the energy beam that is generated via the irradiation device can be determined by measuring various parameters or determining various parameters of the energy beam.

Typically, a respective parameter of the energy beam is determined in a separate determination step advance to the actual additive manufacturing process. Thereby, the energy beam is guided to a determination device that is adapted to determine the respective parameter of the energy beam.

A respective determination device can be mounted in the process chamber of an apparatus to measure the energy beam, in particular to determine the at least one parameter of the energy beam. After the determination of the parameter and a corresponding calibration if the energy beam is finished, the determination device can be unmounted from the process chamber and the additive manufacturing process can be performed.

As the determination device has to be mounted inside the process chamber and the energy beam is guided onto the determination device, determining the at least one parameter is cumbersome and time consuming, as a user or service personnel has to mount and unmount the determination device for determining the parameter and calibrate the energy beam.

Further, a determination of the parameter during the additive manufacturing process is not possible as the energy beam is guided onto the build plane to irradiate and thereby consolidate the build material selectively in the build plane, so that it is not possible to guide the energy beam simultaneously onto the determination device arranged in the process chamber and perform the additive manufacturing process.

It is an object of the invention to provide an apparatus for additively manufacturing three-dimensional objects in which the determination of at least one parameter of the energy beam is improved.

The object is inventively achieved by an apparatus according to claim 1. Advantageous embodiments of the invention are subject to the dependent claims.

The apparatus ("apparatus") described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder, for instance. A respective energy beam can be a laser beam or an electron beam, for instance. A respective apparatus can be a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, beam guiding elements are used to guide the energy beam from where the energy beam is generated, e.g. in a beam generating unit of the irradiation device, to the build plane in which build material is selectively directly irradiated. Respective beam guiding elements can be or comprise mirrors, for instance. Usually, the respective beam guiding element does not reflect completely (100%) of the radiation, in particular the energy beam, incident on the beam guiding element, but a defined part, usually a minor part, is transmitted through the beam guiding element or scattered at the beam guiding element (typically below 1%). Thus, radiation incident on the beam guiding element is reflected to a defined degree (e.g. 99%) generating a first beam part that is reflected at the beam guiding element towards the build plane (typically containing 99% of the radiation incident on the beam guiding element). A second beam part (radiation incident on the beam guiding element that is scattered at or transmitted through the beam guiding element, e.g. 1%) is generated that is not guided to the build plane and is usually lost; a respective second beam part may undesirably heat up the structure, such as a frame or walls of the apparatus or a component of the apparatus, such as an application unit or the beam guiding element itself.

The invention is based on the idea that a determination device is provided that is adapted to determine at least one parameter of the second beam part. Thus, the first beam part (main part) of the energy beam is reflected at the beam guiding element and therefore, reflected towards the build plane and the second beam part of the energy beam is transmitted through or scattered at the beam guiding element, i.e. not reflected towards the build plane.

The apparatus therefore, suggests using the second beam part that is scattered at or transmitted through the beam guiding element. Instead of having a determination device mounted in the process chamber or a separate beam guiding element splitting off a part of the energy beam exclusively to determine the at least one parameter of the energy beam, the invention suggests using a part of the energy beam, in particular the second beam part, that is hitherto lost and additionally has the unwanted effect of heating up the structure of the apparatus.

According to a first embodiment of the invention, the beam guiding element is arranged between a collimating optical unit and a focusing optical unit. Thus, the beam guiding element may be used to guide the energy beam between a collimating optical unit that is adapted to collimate the energy beam and a focusing optical unit that is adapted to focus the collimated energy beam onto the build plane. Thus, it is possible to determine the at least one parameter in a collimated part of the energy beam, whereby, for example, misalignments of the collimating optical unit can be determined. Further, the beam guiding element may be arranged along the beam path between a beam generating unit adapted to generate the energy beam and a beam deflection unit adapted to guide the energy beam in the build plane or a beam emitting unit adapted to emit the energy beam towards the build plane. The collimating optical unit, the beam guiding element and the focusing optical unit can be understood as a functional unit used to guide the energy beam.

Advantageously, the determination device may be adapted to determine the at least one parameter during a manufacturing process. Thus, the determination device can determine the at least one parameter of the energy beam while the additive manufacturing process is performed or while an object is additively built, respectively. The at least one parameter of the energy beam may thus, be determined in situ, as it is not necessary to mount a determination device inside the process chamber and guide the energy beam onto or to the determination device to determine the at least one parameter of the energy beam. Instead, the part of the energy beam that would usually be lost (second beam part) is used to determine the at least one parameter of the energy beam, whereby the determination can take place while the additive manufacturing process is performed.

Various parameters of the second beam part and thus, the energy beam can be determined via the determination device. The at least one parameter of the second beam part may be or may comprise an energy beam power and/or an energy beam intensity and/or a beam profile of the energy beam and/or a focal position of the energy beam and/or a focus shift of the energy beam. Determining the at least one parameter allows for meeting defined process quality requirements and/or object requirements or ensuring that defined process quality requirements and/or object requirements are met, respectively.

For example, if at least one beam parameter of the energy beam deviates from a predefined value, deviations in the additively manufactured object can occur. In particular, if a parameter of the energy beam, such as the focal position of the energy beam, deviates from a predefined value, the corresponding region of the build plane is not irradiated as desired or required, wherein imperfections in the additively manufactured object can occur. For example, the depletion of an amount of energy differing from a defined amount required to properly consolidate the build material could lead to an imperfect consolidating result that could also have impacts on the mechanical properties of the additively built object. Thus, having the at least one parameter of the second beam part determined allows for monitoring and ensuring that defined process quality and object quality is met.

The determination device may in particular be adapted to determine the energy beam power of the second beam part via an integral of an energy beam intensity distribution. The energy beam intensity distribution maybe determined or measured via a corresponding sensor, for example an optical sensor, such as a CCD camera or a CMOS sensor, e.g. a pyrocamera.

According to another embodiment of the apparatus, the determination device may be adapted to determine a position and/or orientation of the energy beam relative to at least one optical unit, in particular a collimating optical unit, by fitting at least one function to the at least one determined parameter, in particular a Gaussian fit. The determination of the position of the energy beam relative to at least one optical unit may indicate a misalignment of the at least one optical unit, which can be compensated or adjusted accordingly. A function can be fitted to the at least one determined parameter, in particular using a Gaussian fit (dependent on the beam profile of the energy beam). Fitting the corresponding function to the determined parameter of the energy beam allows for determining the actual position of the energy beam relative to the at least one optical unit. The actual position can subsequently be compared with a nominal or reference position, whereby deviations from the nominal or reference position can be compensated.

The apparatus may comprise a calibration unit that is adapted to adjust a position of at least one optical unit, in particular the collimating optical unit, relative to the energy beam path, in particular in x- and y-direction. The calibration unit is provided for adjusting the at least one optical unit, in particular adjust a position of the at least one optical unit, for example the collimating optical unit, relative to the beam path of the energy beam. As described before, a misalignment of the at least one optical unit, e.g. in x- and/or y-direction can be determined via a comparison between a nominal or reference position and a current position of the energy beam. Occurring deviations can subsequently be calibrated via the calibration unit.

According to another embodiment of the apparatus, the determination device comprises at least one first determination unit adapted to determine the at least one parameter and at least one second determination unit adapted to determine at least one second parameter of radiation emitted from the build plane. Thus, the second determination unit is provided for determining at least one second parameter of radiation that is emitted from the build plane. Thus, information can not only be generated relating to the energy beam that is generated via the irradiation device, but information can also be generated relating to radiation that is emitted from the build plane. The term "emitted from the build plane" refers to radiation that is directly emitted from the build plane, such as thermal radiation, and also refers to radiation that is reflected at the build plane, for example a reflected part of the energy beam that is reflected at the surface of the build plane.

The determination of the second parameter therefore, also gives rise for determining object quality and/or process quality due to monitoring the build plane. Thus, determining the second parameter allows for generating information relating to the manufacturing process, in particular regarding the build plane. Thus, the consolidation process and the build plane can directly be monitored, for example, regarding the occurring temperatures and/or temperature gradients in the build plane.

The at least one second parameter may therefore, be or comprise a heat dissipation in the build plane and/or a temperature of at least one region in the build plane and/or a position of the spot of the energy beam and/or a focal position and/or a focus shift of the energy beam and/or a coma of the energy beam. Determining the at least one second parameter allows ensuring that defined process quality requirements and/or object requirements are met. For example, if at least one second parameter deviates from a predefined value, deviations in the additively manufactured objects can occur. Thus, determining the at least one second parameter can be used to control the additive manufacturing process, e.g. a structure, in particular the behavior of a microstructure in the consolidation zones in the build plane.

According to another embodiment of the apparatus, the first and/or the second determination unit comprises an optical detection element, in particular a photo diode. Via the at least one optical detection element various parameters, in particular process parameters or physical parameters of the energy beam and/or radiation emitted from the build plane can be determined and evaluated, such as an absolute temperature, effects on the structure, in particular the microstructure during a sintering or a melting process. In particular, it is also possible to monitor zones adjacent to a consolidation zone. Using a respective optical detection element, e.g. a camera and/or a pyrometer, further allows for a spatially and/or timely resolved determination of the temperatures and/or the heat dissipation in the build plane.

Further, the apparatus may comprise at least one damping unit adapted to reduce an intensity of the second beam part. Thus, the intensity of the second beam part may further be damped, for example, with a corresponding filter element forming part of the damping unit, such as a polarization filter or a neutral density filter. Thus, the intensity of the second beam part can be adapted to fit the intensity required, e.g. which can maximally be received by the corresponding determination unit. Usually, the reflection coating or the reflection ability of the beam guiding unit may allow for above 90% to be reflected at the beam guiding element, in particular above 99%, in that only less than 1% is scattered or transmitted through the beam guiding element and therefore, can be used to determine the at least one parameter of the second beam part. For example, the beam guiding unit reflects 99.8% of the energy beam incident on the beam guiding element, whereby 0.2% is transmitted through or scattered at the beam guiding element and can be used to determine the at least one parameter via the determination device.

Further, a control unit may be provided that is adapted to control the energy beam dependent on the at least one determined parameter, in particular the at least one parameter and/or the at least one second parameter. Thus, the control unit may adjust the energy beam dependent on the at least one determined parameter.

Besides, the invention relates to a determination device for an apparatus for additively manufacturing of three-dimensional objects, in particular for an inventive apparatus, as described before, whereby the determination device is adapted to determine at least one parameter of a second beam part of an energy beam that is generated via an irradiation device of the apparatus, whereby the energy beam is partially reflected at at least one beam guiding element, whereby a first beam part extends between the beam guiding element and a build plane of the apparatus and the second beam part is transmitted through or scattered at the beam guiding element.

Additionally, the invention relates to a method for operating at least one apparatus for additively manufacturing of three-dimensional objects by means of successive layerwise selective irradiation and consolidation of layers of a build material which can be consolidated by means of an energy source, which apparatus comprises an irradiation device with at least one beam guiding element on which the energy beam is partially reflected, whereby a first beam part extends between the beam guiding element and a build plane of the apparatus and a second beam part is transmitted through or scattered at the beam guiding element, whereby at least one parameter of the second beam part is determined.

Of course, all features, details and advantages described with respect to the inventive apparatus are fully transferable to the inventive determination device and the inventive method. Of course, the inventive method can be performed on the inventive apparatus.

An exemplary embodiment of the invention is described with reference to the FIGURE The sole FIGURE is a schematic diagram, showing an exemplary embodiment of an inventive apparatus.

The sole FIGURE shows an apparatus 1 for additively manufacturing of three-dimensional objects 2 by means of successive layerwise selective irradiation and consolidation of layers of a build material 3 which can be consolidated by means of at least one energy beam 4. The apparatus 1 comprises an irradiation device 5 that is adapted to generate the energy beam 4, for example via a beam generating device 6, such as a laser or a light-emitting diode. The irradiation device 5 further comprises a beam guiding element 7 at which the energy beam 4 is reflected towards a build plane 18 in which build material 3 is directly irradiated. The irradiation device 5 further comprises a collimating optical unit 8 and a focusing optical unit 9.

As can be derived from the sole FIGURE, the beam guiding element 7 is arranged in the beam path of the energy beam 4 between the collimating optical unit 8 and the focusing optical unit 9. Since the energy beam 4 is not reflected completely (100%) at the beam guiding element 7, the energy beam 4 is split into a first beam part 10 that extends between the beam guiding element 7 and the build plane 18 and a second beam part 11 that is transmitted through (or scattered at) the beam guiding element 7. In other words, due to the imperfect reflection of the energy beam 4 at the beam guiding element 7 the first beam part 10 is generated which is reflected at the beam guiding element 7 towards the build plane 18. Further, the second beam part 11 is generated which is transmitted through the beam guiding element 7. Thus, the energy beam 4 is split into the first beam part 10 which is reflected at the beam guiding element 7 and the second beam part 11 which is transmitted through the beam guiding element 7. In this exemplary embodiment 99.8% of the energy beam 4 is reflected as first beam part 10 and 0.2% of the energy beam 4 is transmitted as second beam part 11.

The apparatus 1 comprises a determination device 12 with a first determination unit 13 and a second determination unit 14, whereby the second determination unit 14 is merely optional and will be described below.

The second beam part 11 extends between the beam guiding element 7 and the first determination unit 13, whereby the second beam part 11 can optionally be damped with a damping unit 15, e.g. a neutral density filter. Due to the confocal arrangement of the first determination unit 13 and the energy beam 4, it is possible to determine at least one parameter of the second beam part 11 while the additive manufacturing process is performed, in particular while the object 2 is additively built in the build plane 18.

The at least one parameter of the second beam part 11 may comprise various parameters relating to the second beam part 11, such as an energy beam power and/or an energy beam intensity and/or a beam profile of the energy beam 4 and/or a focal position of the energy beam 4 and/or a focus shift of the energy beam 4. Of course, an arbitrary selection of which parameters are determined can be made. Further, the first determination unit 13 is adapted to determine a misalignment of the collimating optical unit 8 with respect to the energy beam 4. The misalignment can, for example, be determined via fitting a corresponding function to the at least one determined parameter, in particular a Gaussian fit, as the energy beam 4 according to this example comprises a Gaussian beam profile. Of course, an energy beam 4 with any arbitrary other beam profile may be used instead.

The apparatus 1 further comprises a calibration unit 16 that is adapted to move the collimating optical unit 8 and the focusing optical unit 9, in particular to position the collimating optical unit 8 and the focusing optical unit 9 relative to the energy beam 4.

The second determination unit 14 is adapted to determine at least one second parameter of radiation 17 emitted from the build plane 18. The at least one second parameter may be or may comprise a heat dissipation in the build plane 18 and/or a temperature of at least one region of the build plane 18 and/or a position of a spot of the energy beam 4 of the first beam part 10, respectively, and/or a focal position and/or a focus shift of the energy beam 4 and/or a coma of the energy beam 4.

The first and the second determination unit 13, 14 comprise optical detection elements, for example photodiodes, CCD cameras or CMOS sensors or pyrometers to determine the respective parameters of the second beam part 11 or the radiation 17 emitted from the build plane 18.

Of course, the inventive method can be performed on the inventive apparatus 1.

The invention claimed is:

1. An apparatus for additively manufacturing three-dimensional objects, the apparatus comprising:
    an energy beam comprising:
        a first beam part split from the energy beam reflected by an at least one beam guiding element, the first beam part extending from the at least one beam guiding element to a build plane; and
        a second beam part split from the energy beam transmitted through or scattered by the at least one beam guiding element, the second beam part extending from the at least one beam guiding element to a determination device;
    an irradiation device comprising the at least one beam guiding element, the at least one beam guiding element configured to partially reflect the energy beam; and
    the determination device adapted to determine, based on the second beam part, at least one energy beam parameter, wherein the at least one energy beam parameter comprises at least one of:
    a focal position of the energy beam; or
    a focal shift of the energy beam.

2. The apparatus according to claim 1, wherein the at least one beam guiding element is arranged between a collimating optical unit and a focusing optical unit.

3. The apparatus according to claim 2, wherein the determination device is adapted to calibrate a focal position of the energy beam at the collimating optical unit.

4. The apparatus according to claim 3, wherein the determination device is adapted to calibrate the focal position of the energy beam via a comparison of an actual focal position with a target focal position.

5. The apparatus according to claim 1, wherein the determination device is adapted to determine a power of the energy beam with an integral of an energy beam intensity distribution.

6. The apparatus according to claim 1, wherein the determination device is adapted to determine a position of the energy beam relative to at least one optical unit.

7. The apparatus according to claim 6, wherein the determination device is adapted to determine the position of the energy beam relative to a collimating optical unit based at least in part on a Gaussian fit.

8. The apparatus according to claim 1, further comprising a calibration unit adapted to adjust a position of at least one optical unit relative to an energy beam path.

9. The apparatus according to claim 8, wherein the calibration unit is adapted to adjust the position of at least one optical unit relative to the energy beam path in at least two dimensions.

10. The apparatus according to claim 1, wherein the determination device comprises:
    a first determination unit adapted to determine the at least one energy beam parameter; and
    a second determination unit adapted to determine at least one build plane parameter of radiation emitted from the build plane.

11. The apparatus according to claim 10, wherein the at least one build plane parameter comprises at least one of:
    a heat dissipation in the build plane;
    a temperature of at least one region in the build plane;
    a position of the energy beam;
    a focal position and/or a focal shift of the energy beam; or
    a coma of the energy beam.

12. The apparatus according to claim 10, wherein at least one of the first determination unit or the second determination unit comprises an optical detection element.

13. The apparatus according to claim 12, wherein the optical detection element comprises a photo diode.

14. The apparatus according to claim 1, further comprising at least one damping unit adapted to reduce an intensity of the second beam part.

15. A method for operating the apparatus of claim 1 for additively manufacturing three-dimensional objects by means of successive layerwise selective irradiation and consolidation of layers of a build material which can be consolidated by means of an energy source, the method comprising: generating an energy beam with an irradiation device; partially reflecting the energy beam with at least one beam guiding element; transmitting a first beam part split from the energy beam from the at least one beam guiding element to a build plane; transmitting a second beam part split from the energy beam through or scattered at the at least one beam guiding element, from the at least one beam guiding element to a determination device; and determining, with the determination device, at least one parameter of the energy beam based on the second beam part, wherein the at least one parameter comprises at least one of: a focal position of the energy beam; or a focal shift of the energy beam.

16. The apparatus according to claim 8, wherein the at least one optical unit includes a first optical unit that is a collimation unit and a second optical unit that is a focusing unit, wherein the calibration unit is adapted to adjust the respective positions of the first and second optical units relative to the energy beam path.

\* \* \* \* \*